US012783695B2

(12) United States Patent
Kandula et al.

(10) Patent No.: US 12,783,695 B2
(45) Date of Patent: Nov. 3, 2026

(54) DEVICE AND METHOD FOR SECURELY COMMUNICATING INTENTS BETWEEN APPLICATIONS RUNNING ON A SAME COMPUTING DEVICE

(71) Applicant: MOTOROLA SOLUTIONS, INC., Chicago, IL (US)

(72) Inventors: Ramu Kandula, Oak Point, TX (US); Raajeev Kuppa, Richardson, TX (US); Rajendra Anthony, Richardson, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 52 days.

(21) Appl. No.: 18/935,856

(22) Filed: Nov. 4, 2024

(65) Prior Publication Data

US 2026/0127295 A1 May 7, 2026

(51) Int. Cl.

*H04L 29/06* (2006.01)
*G06F 21/60* (2013.01)
*H04L 9/08* (2006.01)

(52) U.S. Cl.

CPC .......... *G06F 21/602* (2013.01); *H04L 9/0819* (2013.01)

(58) Field of Classification Search

CPC .... G06F 21/602; G06F 7/4824; G06F 21/629; G06F 2209/482; G06F 2211/008; G06F 16/437; G06F 21/31; H04L 9/0819; H04L 67/60; H04L 9/08; H04L 9/0816; H04L 9/0825; H04L 9/3249; H04L 9/3252; H04L 63/061; H04L 63/062; H04L 63/064; H04M 1/66; H04M 2215/7826; H04N 21/4182; H04N 21/441; H04N 21/4508;

(Continued)

(56) References Cited

U.S. PATENT DOCUMENTS

| | | | | |
|---|---|---|---|---|
| 9,117,087 | B2 | 8/2015 | Tan et al. | |
| 10,397,186 | B2 * | 8/2019 | Clark | H04L 63/0272 |

(Continued)

OTHER PUBLICATIONS

Wilayat Khan et al: "CrashSafe: a formal model for proving crash-safety of Android applications", Human-Centric Computing and Information Sciences, Biomed Central Ltd, London, UK, vol. 8, No. 1, Jul. 26, 2018 (Jul. 26, 2018), pp. 1-24.

(Continued)

*Primary Examiner* — Edward Zee
*Assistant Examiner* — Leynna Truvan
(74) *Attorney, Agent, or Firm* — Raguraman Kumaresan

(57) ABSTRACT

A process for securely communicating intents between applications running on the same computing device. A first application running on a computing device and signed in using a first identity of a first user receives a request to invoke an intent with a second application running on the computing device. The first application generates an intent private key in response to determining that the intent is to be accepted at the second application while the second application is signed in by a first user using a second identity. The first application encrypts and signs a key exchange message encapsulating the intent private key using parameters associated with the first and second identities of the first user. The first application encrypts the intent using the intent private key and securely communicates the intent to the second application.

20 Claims, 6 Drawing Sheets

(58) Field of Classification Search

CPC ............... H04N 21/47; H04N 21/4753; H04N 21/8173; H04N 21/42684; H04N 2201/3205; H04N 21/6334; H04N 21/63345; H04W 12/0471; H04W 4/14; H04W 12/106; H04W 88/023; G06Q 20/363; G06Q 30/0269; G06Q 20/40; G07F 7/1025; G07F 7/025; G10H 2240/101; G10H 2240/105; G10H 2240/111; G11B 20/00282; G11B 20/00492; G01N 35/00722; G03G 15/5091; G05B 2219/25423; G07B 2017/00766; G07B 2017/00895; G07B 2017/00854

See application file for complete search history.

(56) References Cited

U.S. PATENT DOCUMENTS

| | | | | |
|---|---|---|---|---|
| 2008/0215883 | A1 | 9/2008 | Fok et al. | |
| 2014/0068779 | A1 | 3/2014 | Tan et al. | |
| 2016/0173281 | A1* | 6/2016 | White | H04W 12/06<br>713/193 |
| 2017/0302449 | A1 | 10/2017 | Wagner et al. | |

OTHER PUBLICATIONS

The International Search Report and the Written Opinion, corresponding patent application No. PCT/US2025/052037 filed: Oct. 22, 2025, mailed Mar. 3, 2026, all pages.

* cited by examiner

DEVICE AND METHOD FOR SECURELY COMMUNICATING INTENTS BETWEEN APPLICATIONS RUNNING ON A SAME COMPUTING DEVICE

BACKGROUND

Computing devices such as smartphones and radios operate through operating systems and applications to manage tasks and provide communication services. Operating systems use messages to facilitate communications between applications installed on a device. For instance, the Android™ operating system relies on messaging objects called "intents" for sending and receiving data, initiating actions, or triggering processes between applications. As an example, a messaging application may use an intent to request a map application to launch a navigation service corresponding to an address displayed on a text message. As another example, the mapping application may use an intent to request the messaging application to send the location of a user with the user's contact stored in the messaging application.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
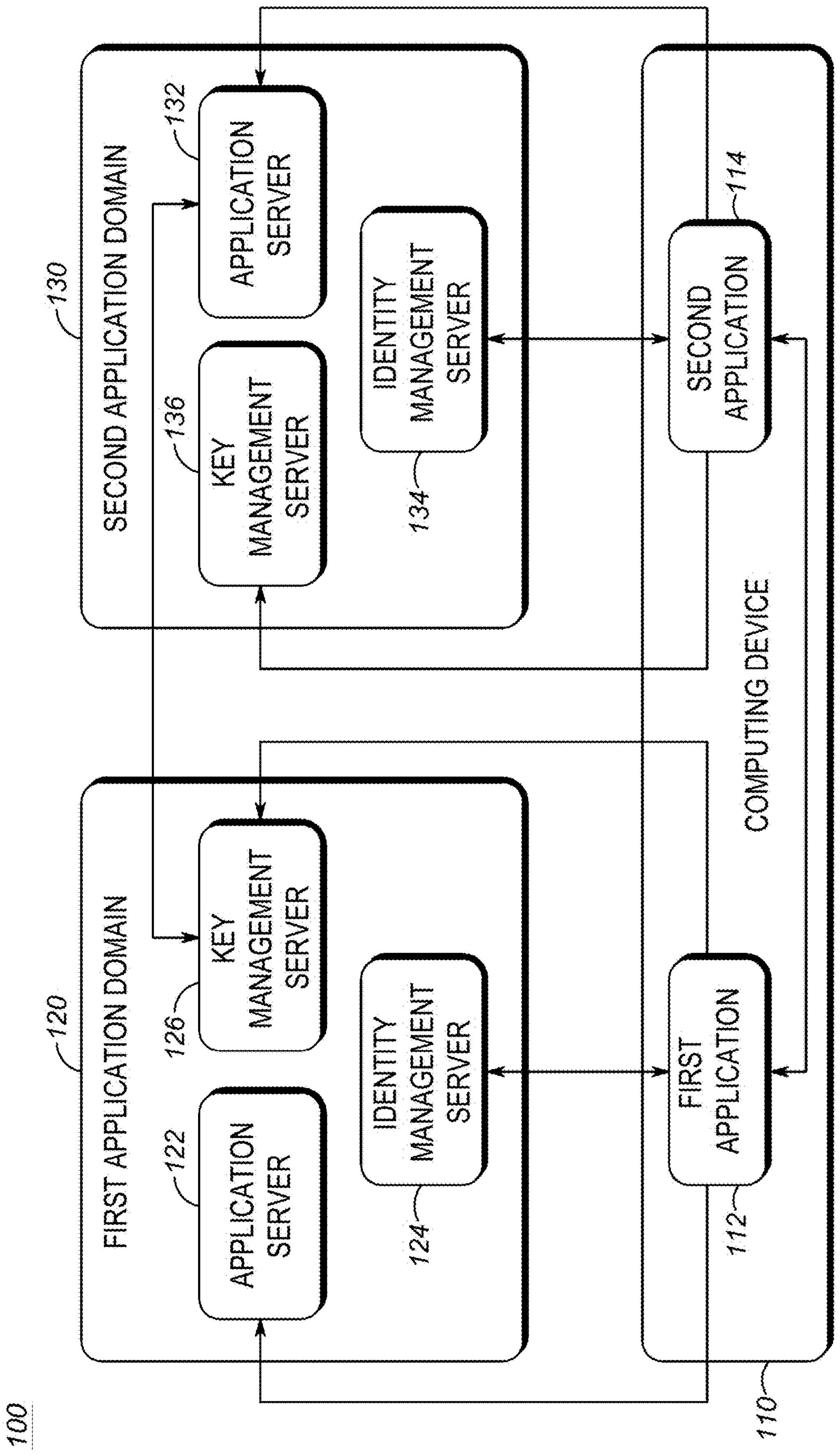
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, intents are useful to facilitate seamless communication between applications. However, the information exchanged by means of intents is not secure as it is visible to entities having access to the device's operating system environment. Devices are sometimes shared by multiple users and an application residing on the device may handle data and services for multiple users. For example, a first application running on a particular computing device may share sensitive information about a first user to a second application running on the same computing device by invoking an intent. The second application may store information corresponding to the first user while executing the intent invoked by the first application. In this case, a second user having access to the second application on the same computing device may be able to access the information stored by the second application corresponding to the first user even though the second user is not otherwise authorized to access the information shared corresponding to the user. Accordingly, there is a need for a technological solution that provides for secure communications of intents between applications running on a computing device.

A first embodiment provides a method for securely communicating intents between applications running on a same computing device. The method comprises: receiving, at a first application running on a computing device, a request to invoke an intent with a second application running on the computing device while the first application is operating on behalf of a first user signed in to the first application using a first identity of the first user; determining, at the first application, from a security policy, that the intent to be invoked by the first application is to be accepted at the second application while the second application is operating on behalf of the first user signed in to the second application using a second identity of the first user; generating, based on the determination, an intent private key at a first application running on a computing device; generating, at the first application, a key exchange message encapsulating the intent private key, the key exchange message being encrypted and signed using one or more of a first set of parameters associated with the first identity of the first user and one or more of a second set of parameters associated with the second identity of the first user; transmitting the key exchange message from the first application to the second application to enable the second application, by using one or more of a third set of parameters associated with the first identity of the first user and one or more of a fourth set of parameters associated with the second identity of the first user, to decrypt the key exchange message, verify a signature applied to the key exchange message, and retrieve the intent private key from the key exchange message; and securely communicating the intent from the first application to the second application by encrypting the intent invoked by the first application using the intent private key.

A second embodiment provides for securely communicating intents between applications running on a same computing device. The method comprises: receiving, at a first application running on a computing device, a request to invoke an intent with a second application running on the computing device while the first application is operating on behalf of a first user signed in to the first application using a first identity of the first user; determining, at the first application, from a security policy, that the intent to be invoked by the first application is to be accepted at the second application while the second application is operating on behalf of a second user signed in to the second application using a second identity of the second user; generating, based on the determination, an intent private key at a first application running on a computing device; generating, at the first application, a key exchange message encapsulating the intent private key, the key exchange message being encrypted and signed using one or more of a first set of parameters associated with the first identity of the first user and one or more of a second set of parameters associated with the second identity of the second user; transmitting the key exchange message from the first application to the second application to enable the second application, by using one or more of a third set of parameters associated with the first identity of the first user and one or more of a fourth set of parameters associated with the second identity of the second user, to decrypt the key exchange message, verify a signature applied to the key exchange message, and retrieve the intent private key from the key exchange message; and securely communicating the intent from the first application to the second application by encrypting the intent invoked by the first application using the intent private key.

A third embodiment provides a computing device comprising an electronic processor and a memory communicatively coupled to the electronic processor. The memory stores program instructions that, when executed by the electronic processor, cause a first application running on the computing device to: receive a request to invoke an intent with a second application running on the computing device while the first application is operating on behalf of a first user signed in to the first application using a first identity of the first user; determine, from a security policy, that the intent to be invoked by the first application is to be accepted at the second application while the second application is operating on behalf of the first user signed in to the second application using a second identity of the first user; generate, based on the determination, an intent private key; generate, at the first application, a key exchange message encapsulating the intent private key, the key exchange message being encrypted and signed using one or more of a first set of parameters associated with the first identity of the first user and one or more of a second set of parameters associated with the second identity of the first user; transmit the key exchange message to the second application to enable the second application, by using one or more of a third set of parameters associated with the first identity of the first user and one or more of a fourth set of parameters associated with the second identity of the first user, to decrypt the key exchange message, verify a signature applied to the key exchange message, and retrieve the intent private key from the key exchange message; and securely communicate the intent to the second application by encrypting the intent invoked by the first application using the intent private key.

Each of the above-mentioned embodiments will be discussed in more detail below, starting with example system and device architectures of the system in which the embodiments may be practiced, followed by an illustration of processing blocks for achieving an improved technical system, method, and device for securely communicating intents between applications running on a same computing device. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as “blocks” rather than “steps.”

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including a computing device 110, a first application domain 120, and a second application domain 130. In accordance with some embodiments, the computing device 110 is a mobile computing device including, but not limited to, two-way radios (e.g., land mobile radio or LMR), mobile phones, cellular phones, smart phones, vehicular radios, laptop computers, and tablets. In other embodiments, the computing device 110 may include a fixed computing device such as a desktop computer. In accordance with some embodiments, the computing device 110 refers to a communication device that is shared by multiple users. For instance, in a public-safety environment, officers (e.g., police, fire, emergency medical personnel) frequently use such shared devices. The computing device 110 can be picked by any authorized user from a shared storage location (such as a charging shelf or equipment rack) and used immediately without requiring pre-assignment to a particular user. Each user may log into the device 110 and/or one or more applications provided on the device 110 using their own access credentials (e.g., username and password or forms of authentication, such as biometric data). Although the system is illustrated in FIG. 1 as including a single computing device 110, the embodiments described herein can be suitably implemented in a number of computing devices where there is a need to securely communicate intents between applications running at a computing device.

In accordance with embodiments, the computing device 110 includes multiple client-side applications, for example, a first application 112 and a second application 114, running on the computing device 110. The applications running on the computing device 110 refers to a software program that is actively being executed by an electronic processor (e.g., electronic processor 213 shown in FIG. 2) of the computing device 110. The applications (or apps) are designed to perform specific tasks or functions, ranging from simple utilities like calculators or text editors to more complex systems such as web browsers, maps, and communications tools. The applications are run utilizing hardware resources such as memory, storage, and processing power available at the computing device 110 to execute instructions, process user inputs, and produce outputs or perform actions. In accordance with embodiments, the applications running on the computing device 110 may refer to a foreground application, where users directly interact with them, or in the background, where tasks are performed on behalf of users without direct user engagement.

In accordance with embodiments, communications or interactions between applications are facilitated by the operating system of the computing device 110 using messaging objects. The embodiments described herein can be implemented for computing devices 110 running any type of operating systems. The Android™ operating system uses messaging objects called "intents" to facilitate interactions between applications. While other operating systems may refer to such messaging objects by different names, the term "intent" is intended herein to broadly cover any messaging object that are used to facilitate interactions between applications, either for sending or receiving data from one application to another application, initiating actions on another application, or triggering processes to run on another application. As an example, a first application 112 running on the computing device 110 may represent a navigation application (e.g., Global Positioning System (GPS) based map application) and a second application 114 running on the computing device may refer to a call/messaging application (e.g., mission-critical push-to-talk (MCPTT) application). In this example, the first application 112 or the navigation application may need to interact with the second application 114 or the call/messaging application to provide location-based updates or route guidance to officers during emergency responses. As another example, the first application 112 running on the computing device 110 may refer to a telemetry application that is configured to detect an emergency condition (e.g., a fall detection event) corresponding to the officer and further interact with the second application 114 or the call/messaging application to automatically report the emergency condition associated with the officer to a dispatcher.

In accordance with embodiments, the first application 112 initiates an interaction with the second application 114 by invoking an intent. The first application 112 may invoke an intent by generating an intent message and transmitting the intent message to the second application 114. The intent message includes parameters that define the action (e.g., share a file, initiate a call, or generate a route guidance) to be performed by the second application 114 and any additional data (e.g., uniform resource locator (URL) or a resource address representing a file path in which the path is stored, or contact to whom the call is to be initiated, or address to which the route guidance is to be generated) required for the second application 114 to execute the action. The intent message from the first application 112 may also further identify a specific application (e.g., the second application 114) that should accept and handle the intent. An application may be referred herein as an originating application when the application intends to invoke or communicate an intent with another application. An application may be referred herein as a terminating application when the application is intended to receive, accept, or execute an intent invoked by an originating application.

Assume a scenario where the first application 112 and second application 114 are signed in by different users including a first user and a second user, respectively. When the first application 112 invokes an intent with the second application 114, any information (e.g., location information retrieved corresponding to the first user of the first application 112) included in the intent may be stored at the second application 114 when the second application 114 accepts and executes the intent. In such a scenario, it is possible for the second user of the second application 114 to view information stored by the second application 114 even though the second user may not be otherwise authorized to access such information (e.g., location information) corresponding to the first user. To address the above problem, the embodiments described herein provide for secure communication of intents between applications by encrypting intents using a key (also referred herein as an "intent private key") negotiated between the applications. The intent private key to be used for encrypting intents communicated between applications is negotiated either based on whether the applications are operating on behalf of a same user signed into both the applications or based on whether the applications are operating on behalf of different users signed into the applications where each user has authorization (e.g., as specified in a security policy) to access information included in an intent.

The term "signed in" or "logged in" described herein refers to the state where a user has accessed an application (or has accessed the data processed or retrieved by the application) running on a computing device by providing a form of user identity, such as a username and password, biometric data, or an access token. The term "user" described herein refers to any individual or entity that has authenticated access to interact with an application. As an example, the user may be an individual user who has signed in to use the application on their personal or company issued computing device. As another example, the user may refer to a business, organization, a company, or an agency that has one or more applications pre-installed and pre-signed in one or more devices issued to its employees, contractors, representatives, associates, or other users. In this example, the user refers to the entity as a whole while individual interactions may occur through the authorized users of the devices.

The system 100 further includes one or more application domains. In the example shown in FIG. 1, a first application 112 is shown as associated with or supported by a first application domain 120 and a second application 114 is shown as associated with or supported by a second application domain 130. The application domains refer to a logically defined environment or framework comprising a set of related services, resources, and operational protocols designed to provide users with secure access to applications, manage user identities, and protect sensitive data from being passed between applications. In accordance with some embodiments, the first application domain 120 associated with the first application 112 includes an application server 122, an identity management (IDM) server 124, and a key management server (KMS) 126. The second application domain 130 associated with the second application 114 similarly includes an application server 132, a second identity management (IDM) server 134, and a key management server (KMS) 134. The application domains 120, 130 may optionally include an intent management server (not shown) that is provisioned with one or more user-specific authorization policies specifying a list of intents that an application is authorized (or not authorized) on behalf of a particular user (i.e., a user signed in to the application) to invoke with or accept from another application. While FIG. 1 shows each application as being associated with a separate application domain, in one embodiment, a single application domain may be provided to support multiple applications (e.g., first and second applications 112, 114) running at a computing device 110.

The application servers 122, 132 may each comprise a server (e.g., an email server, database server, proprietary server, web server, or the like where access to applications is permitted only upon verifying user identity) that gives access to one of any number of applications. The application servers 122, 132 each host, manage, and execute the first application 112 and second applications 114, respectively. The application servers 122, 132 also provide services and support the operation and functionality of the first application 112 and second application 114, respectively. The application servers 122, 132 may serve as a middleware platform that bridges a client device such as the computing device 110 running the respective first and second applications 112, 114 with backend resources (not shown) like database, storage, and other services. The application servers 122, 132 may each be either implemented on a single server or in a distributed environment, with software components running across multiple physical or virtual machines and may communicate with other servers using standard network protocols.

The identity management servers 124, 134 each include a computing platform that respectively enables a user to access computer programs, applications, information and services hosted by the first application domain 120 and the second application domain 130, via the computing device 110. The identity management server 124, 134 is preferably an authentication server equipped with Security Assertion Markup Language (SAML), OAuth, OpenID connect, or other identity-management protocols configured for performing user authentication. The identity management server 124, 134 is sometimes referred to as an authentication server. The identity management server 124, 134 stores and manages identity-related information, such as usernames, passwords, biometric data, and access credentials. For example, when a user attempts to sign into a first application 112, the identity management server 124 serving the first application 112 verifies the login credentials provided by the user. The identity management server 124 may also optionally check the user roles, permissions, and access policies to determine portions of the first application 112 the user is allowed to access. After successful authentication and authorization of the user, the identity management server 124 allows the user to access the functionalities provided by the first application 112. The identity management server 134 associated with the second application domain 130 may similarly verify login credentials of a user attempting to sign into the second application 114 before providing access to functionalities provided by the second application 114.

The key management servers (KMS) 126, 136 each include a computing platform that is respectively configured to provide key management services for the applications 112, 114 running on the computing device 110 by validating an access token of a user signed into the respective first and second applications 112, 114. In accordance with some embodiments, a key management server associated with one application domain is provisioned with KMS certificates of key management servers associated with other application domains. For example, the key management server 126 associated with the first application domain 120 is provisioned with a KMS certificate that binds a public key of the key management server 136 associated with the second application domain 130 to the identity of the key management server 136. The key management server 136 associated with the second application domain 130 is similarly provisioned with a KMS certificate that binds a public key of the key management server 126 associated with the first application domain 120 to the identity of the key management server 126. In one example, an out-of-band provisioning method, for example, as specified in the 3GPP technical specification (TS) 33.180 produced by European Telecommunications Standards Institute (ETSI), is used to provision KMS certificates at the key management servers 126, 136. Once the key management servers 126, 136 have securely received each other's certificates, the key management servers 126, 136 stores the public key of the other key management servers 126, 136 to its list of trusted public keys or certificates. In accordance with some embodiments, the first application 112, when intending to invoke an intent with the second application 114, uses, along with other parameters noted in the embodiments described herein, the public key of the KMS 126 associated with the first application 112 and/or the public key of the KMS 136 associated with the second application 114 for encrypting and signing a key exchange message to be used for transferring an intent private key from the first application 112 to the second application 114. Similarly, the second application 114, when intending to accept an intent invoked by another application such as the first application 112, uses, along with other parameters noted in the embodiments described herein, the public key of the KMS 126 associated with the first application 112 and/or the public key of the KMS 136 associated with the second application 114 for decrypting (and retrieving the intent private key) and verifying a key exchange message that was used for transferring the intent private key from the first application 112 to the second application 114. In accordance with some embodiments, the applications use the intent private key to secure intents communicated between the applications.

The computing device 110 may communicate with different entities (i.e., application servers 122, 132, identity management servers 124, 134, and key management servers 126, 136) associated with the first and second application domains 120, 130 via one or more communication networks (not shown). The communication networks may be implemented using a wide area network, such as the Internet, a local area network, such as a Wi-Fi network, and personal area or near-field networks, for example a Bluetooth™ network. Portions of the communications network may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof. In some embodiments, the communication network may comprise various other devices, such as relays, low power nodes, etc. The communication network may further include backhaul network components, such as various gateways, routers, controllers, schedulers, and the like.

While FIG. 1 illustrates one example embodiment of the system 100, in other embodiments, the system 100 may include more or fewer components and may perform functions that are not explicitly described herein. For example, the system 100 may include additional computing devices, application servers, identity management servers, and key management servers. Further, in some embodiments, one or more entities of the system 100 are combined into a single device. For example, the identity management server 124, 134 and key management server 126, 136 may be combined into a single infrastructure that performs the functions of both entities that are described herein.

Figure 2:
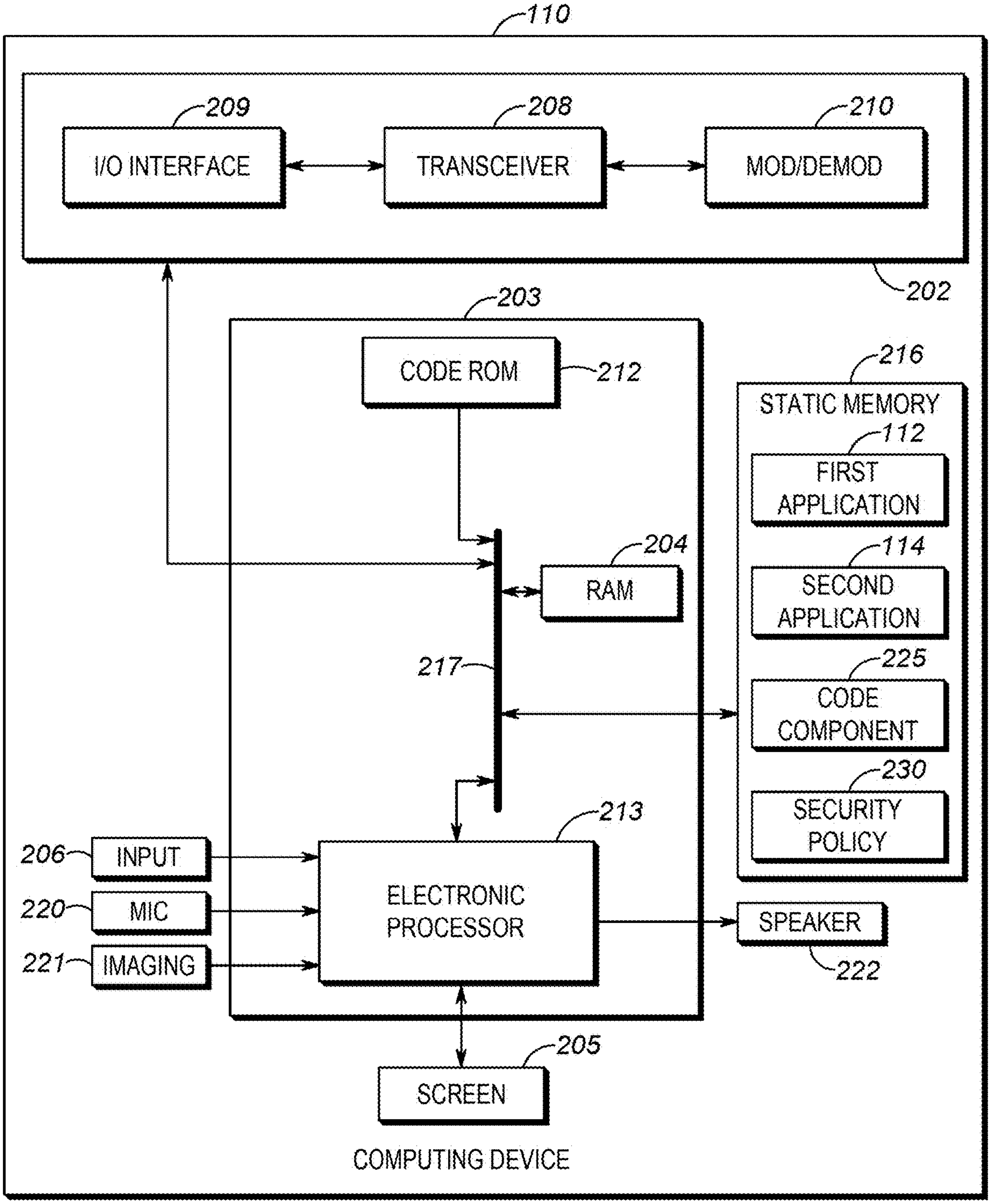
FIG. 2 is a block diagram of a computing device shown in FIG. 1 in accordance with some embodiments.

FIG. 2 is an example functional block diagram of a computing device 110 operating within the system 100 in accordance with some embodiments. The computing device 110 may be embodied in computing devices not illustrated in FIG. 1, and/or may be a distributed computing device across two or more of the foregoing (or multiple of a same type of one of the foregoing) and linked via a wired and/or wireless communication link(s). While FIG. 2 represents a computing device 110 described above with respect to FIG. 1, the computing device 110 may include fewer or additional components in configurations different from that illustrated in FIG. 2.

As shown in FIG. 2, the computing device 110 includes a communications interface 202 coupled to a common data and address bus 217 of a processing unit 203. The communications interface 202 sends and receives data to and from other devices in the system 100. The computing device 110 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The communications interface 202 may include one or more wired and/or wireless input/output (I/O) interfaces 209 that are configurable to communicate with other devices in the system 100. For example, the communications interface 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications interface 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The input 206 may include an alphanumeric physical keypad (or virtual keypad in cooperation with capacitive touch display screen 205) for inputting text for communications. In accordance with some embodiments, the input 206 may include a suitable interface, for example, a hardware or graphical user interface PTT button that functions to activate a transmit function in a half-duplex communication mode, transitioning the computing device 110 (when activated) from a listen-only mode to a transmit-only mode for half-duplex communication. The display screen 205 may further function to display communications received via communications unit 202 from other devices.

A microphone 220 may be provided at the computing device to capture speech input from a user that is further vocoded by processing unit 203 and transmitted as voice, text, or multimedia data by communications unit 202 to other communication devices in the system 100. A communications speaker 222 may be provided to reproduce audio that is decoded from voice data transmissions received from other communication devices via the communications unit 202. The computing device 110 may also include an imaging device 221 that captures video (still or moving images) of an area in a field of view of the computing device 110 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the computing device 110, from other ad-hoc or direct mode devices, and/or from an infrastructure RAN device, or may playback alert tones or other types of pre-recorded audio.

The processing unit 203 may include a code read only memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications interface 202.

Static memory 216 may store operating code 225 for the electronic processor 213 that, when executed, performs one or more of the blocks set forth in the figures, and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 216 is also configured to store client-side applications including the first application 112 and the second application 114 described with reference to FIG. 1, among other program data, filters, rules, one or more program modules, and/or other executable instructions.

In accordance with some embodiments, static memory 216 may store (or computing device 110 has access to, via the communications unit 302) one or more security policies 230. The security policies 230 may be provisioned at the computing device 110 based on input received by a security administrator of the computing device 110. The security policy 230 may be provisioned using any suitable data formats (e.g., JavaScript Object Notation or JSON, Extensible Markup Language or XML, etc.), enabling the applications 112, 114 running on the computing device 110 to parse, process, and enforce the security policy 230. In accordance with some embodiments, the security policy 230 defines restrictions on intents to be invoked by or accepted by applications 112, 114. In one embodiment, as also described in the process 400 shown in FIG. 4, the security policy 230 may specifically identify situations that require an application to encrypt an intent to be invoked by the application with another application. As an example, the security policy 230 may require an intent to be encrypted by the first application 112 when the intent to be invoked by the first application 112 is intended to be accepted at the second application 114 while the second application 114 is operating on behalf of a same user (i.e., requiring a same user to be signed into both the first and second applications 112, 114). In another embodiment, as also described in the process 600 shown in FIG. 6, the security policy 230 may require an intent to be encrypted by the first application 112 when the intent to be invoked by the first application 112 is intended to be accepted at the second application 114 while the second application 114 is operating on behalf of a second user signed into the second application 114, where the second user specified by the security policy 230 is different from a user signed into the first application 112.

Figure 3:
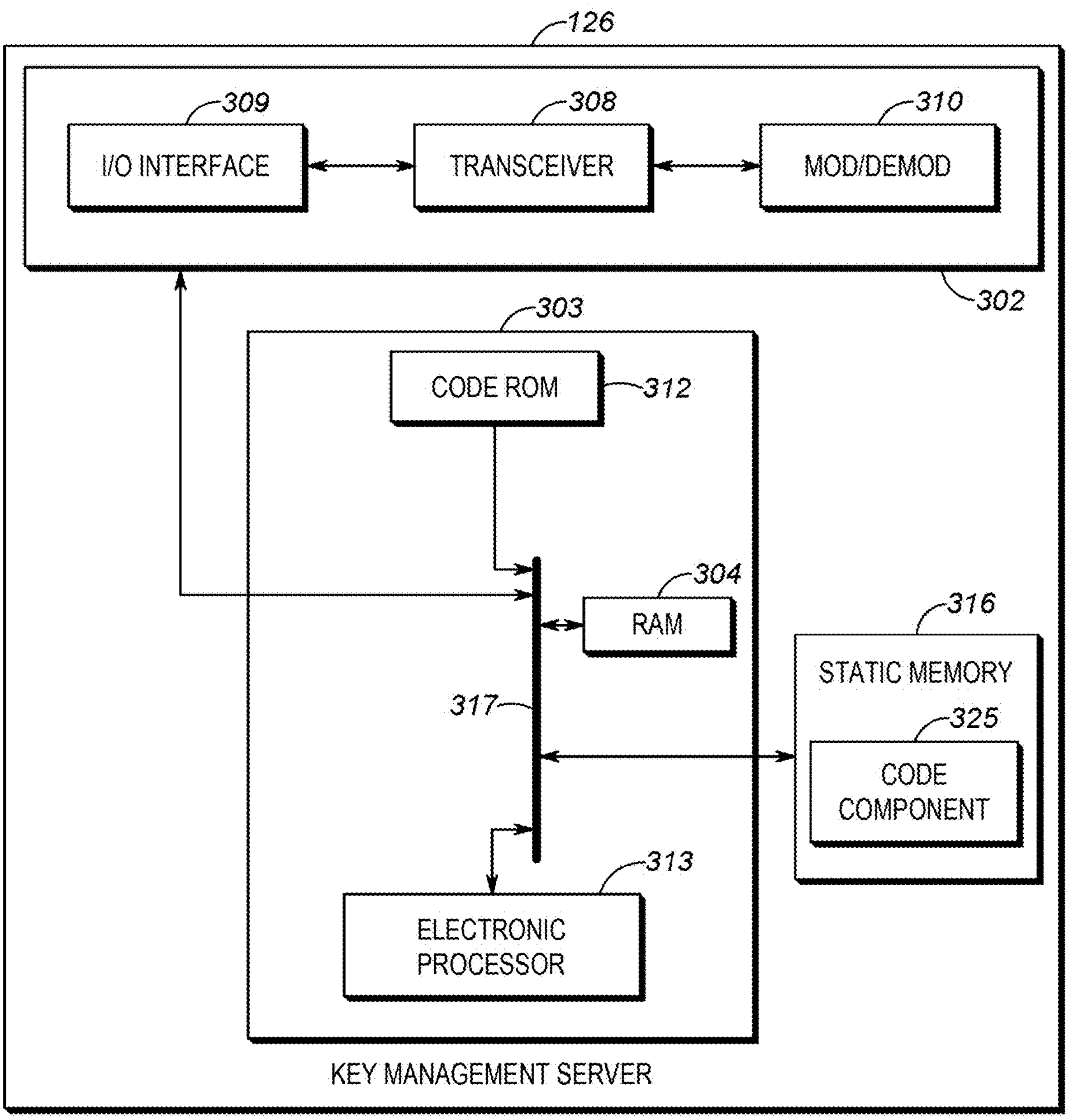
FIG. 3 is a block diagram of a key management server shown in FIG. 1 in accordance with some embodiments.

Now referring to FIG. 3, a schematic diagram illustrates a key management server 126 shown in FIG. 1 in accordance with some embodiments. The key management server 126 may be a standalone device or alternatively implemented as a distributed computing device across two or more of the foregoing (or multiple of the same type of one of the foregoing) and linked via a wired and/or wireless communication link(s). The key management server 126 may also be implemented in a cloud computing platform. Depending on the type of the server, the key management server 126 may include fewer or additional components in configurations different from that illustrated in FIG. 3.

As shown in FIG. 3, the key management server 126 includes a communications unit or communications interface 302 coupled to a common data and address bus 317 of the processing unit 303. The communications unit 302 may include one or more wired or wireless input/output (I/O) interfaces 309 that are configurable to communicate with other devices in or communicably coupled to the system 100. The communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE or 5G transceiver, and/or other similar type of wireless transceiver configurable to communicate via a wireless radio network. The communications unit 302 may additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the processing unit 303.

The processing unit 303 may include a code Read Only Memory (ROM) 312 for storing data for initializing system components, and encoding and/or decoding voice, data, control, or other signals that may be transmitted or received between the key management server 126 and other devices in the system 100. The processing unit 303 includes an electronic processor or microprocessor 313 coupled, by the common data and address bus 317, to a Random Access Memory (RAM) 304, and a static memory 316.

Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few. Static memory 316 stores operating code 325 for the electronic processor 313 that, when executed, performs one or more of the functions set forth in the figures and accompanying text. Static memory 216 is provisioned with (or key management server 126 has access to, via the communications unit 302) (i) a list of KMS certificates (e.g., public keys) of other key management servers (e.g., key management server 136) supporting other application domains (e.g., second application domain 130) and (ii) certificates (e.g., private keys) of users (and users'identities) signed into applications (e.g., first application 112) supported by the first application domain 120.

In accordance with some embodiments, the key management server 136 associated with the second application domain 130 is similarly implemented using the electronic components shown in FIG. 3. For example, the key management server 136 may include a communications interface including one or more wireless transceivers, a processing unit including an electronic processor and a memory including operating code, program, and instructions that, when executed by the electronic processor, enable the key management server 136 to perform a set of similar functions and operations described herein with reference to the figures and the accompanying text. Furthermore, the key management server 136 may be similarly provisioned with provisioned with (i) a list of KMS certificates (e.g., public keys) of other key management servers (e.g., key management server 126) supporting other application domains (e.g., first application domain 120) and (ii) certificates (e.g., private keys) of users (and their corresponding identities) signed into applications (e.g., second application 114) supported by the second application domain 130.

Figure 4:
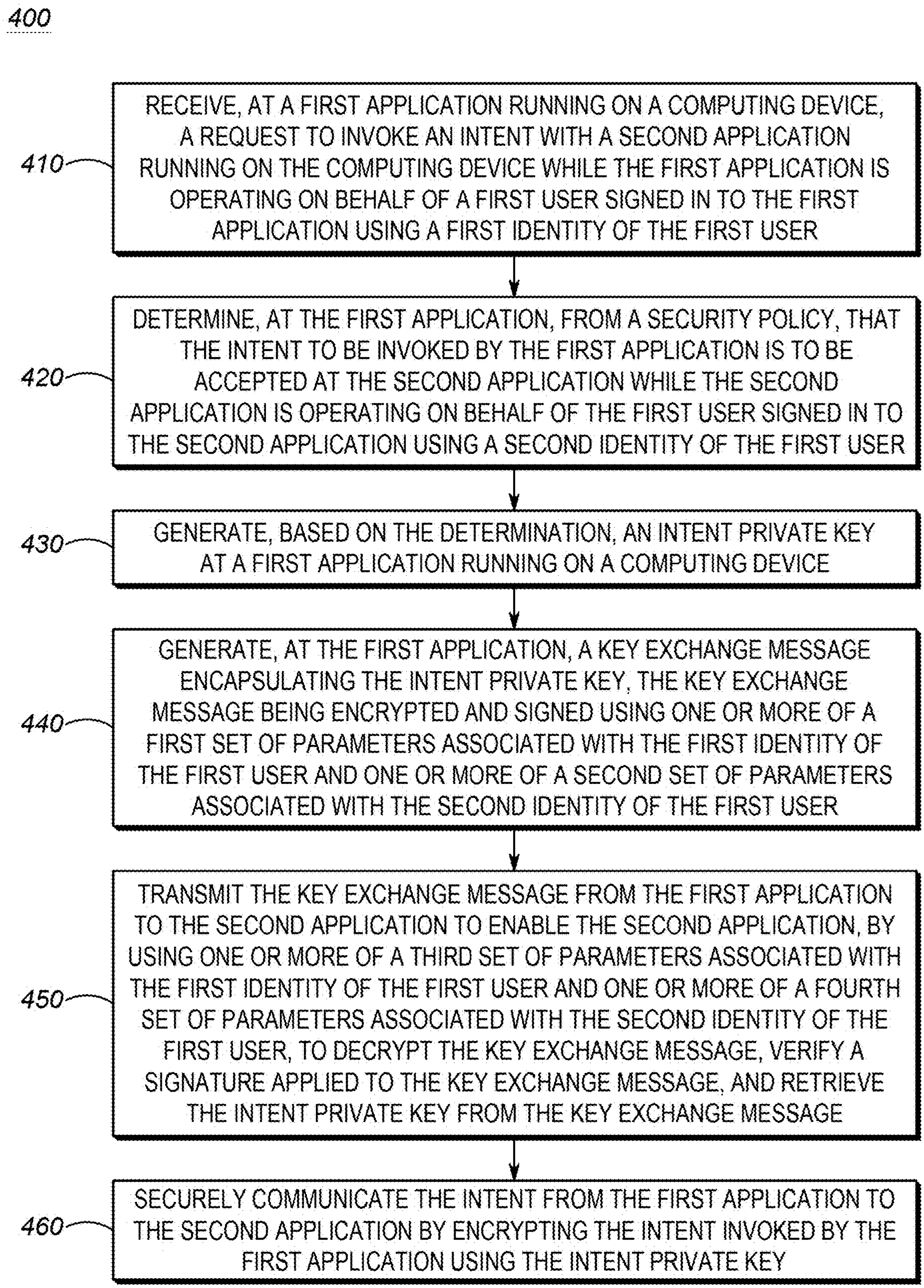
FIG. 4 illustrates a flowchart of a process for securely communicating intents between applications running on a same computing device in accordance with some embodiments.

Turning now to FIG. 4, a flowchart diagram illustrates a process 400 for securely communicating intents between applications (e.g., first and second applications 112, 114) running on a computing device 110. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. A first application 112 running on the computing device 110 shown in FIG. 1 and/or FIG. 2 may execute process 400 via an electronic processor 213.

The first application 112 may execute the process 400 at power-on, at some predetermined periodic time period thereafter, in response to a trigger raised locally at the computing device 110 via an internal process or via an input interface or in response to a trigger from an external device to which the first application 112 running on the computing device 110 is communicably coupled, among other possibilities.

The process 400 of FIG. 4 need not be performed in the exact sequence as shown and likewise various blocks may be performed in different order or alternatively in parallel rather than in sequence. The process 400 may be implemented on variations of the system 100 of FIG. 1 as well. The process 400 is also further described in detail in the example message flow diagram 500 illustrated in FIG. 5.

At block 410, the first application 112 receives a request to invoke an intent with a second application 114 running on the same computing device 110 while the first application 112 is operating on behalf of a first user signed into the first application 112 using a first identity of the first user. The term "first identity" refers to one or more identities used by the first user to sign into the first application 112 after successfully authenticating, for example, with the identity management server 124 supporting the first application domain 120. The first identity includes, but is not limited to, username, user identifier, email address, mobile number, tokens, or other unique identifiers recognized by the identity management server 124 supporting the first application domain 120. In one embodiment, the request to invoke an intent with the second application 114 may be received at the first application 112 based on an input received (e.g., via an input interface 309 of the computing device 110) from the first user signed into the first application 112. As an example, when the first application 112 is a messaging application, the first user may interact with a graphical user interface corresponding to the messaging application 112 to select an address on a text message received via the messaging application to request the messaging application to launch a navigation service (e.g., via a navigation application) corresponding to the selected address. In this example, the first application 112 or the messaging application receives a request to invoke an intent with the second application 114 or the navigation application based on the user interaction with the first application 112. The intent includes requesting the second application 114 or the navigation application to launch a navigation service corresponding to an address selected by a user who is signed into the first application 112. In another embodiment, the request to invoke an intent may be received when another application or service, residing on the computing device 110 or another device, invokes its own intent to request the first application 112 to invoke the intent with the second application 114.

At block 420, the first application 112 determines, from a security policy (e.g., security policy 230 provisioned at the computing device 110), that the intent requested to be invoked by the first application 112 is to be accepted at the second application 114 while the second application 114 is operating on behalf of the first user signed into the second application 114 using a second identity of the first user. In other words, since the security policy requires a same user (i.e., the first user) to be also operating the second application 114 while accepting (i.e., executing the requested intent) the intent, the first application 112 determines that the first application 112 is required by the security policy to encrypt the intent prior to invoking the intent with the second application 114. The term “second identity” refers to one or more identities used by the first user to sign into the second application 114 after successfully authenticating with the identity management server 134 supporting the second application domain 130. The second identity includes, but is not limited to, username, user identifier, email address, mobile number, tokens, or other unique identifiers recognized by the identity management server 134 supporting the second application domain 120. In some cases, it is possible for a user to use the same identity across multiple application domains. As an example, the first identity used by the first user to sign into the first application 112 and the second identity used by the first user to sign into the second application 114 are the same (e.g., same email address).

When the first application 112 determines that the security policy requires encryption of the requested intent before invoking the intent with the second application 114, the first application 112 proceeds to block 430 to generate an intent private key (e.g., a symmetric key) using any suitable key generation algorithms known in the art.

At block 440, the first application 112 generates a key exchange message encapsulating the intent private key generated at block 430. In accordance with embodiments, the first application 112 encrypts and signs the key exchange message using one or more of a first set of parameters associated with the first identity of the first user signed into the first application 112 and one or more of a second set of parameters associated with the second identity of the first user signed into the second application 114. The first application 112 may use any suitable method known in the art for encrypting and signing the key exchange message. In one embodiment, the first application 112 is programmed to use an identity based encryption scheme such as the Multimedia Internet KEYing-Sakai-Kasahara Key Encryption (MIKEY-SAKKE) scheme. In this embodiment, the first set of parameters include (i) a public key of the key management server 126 associated with the first application 112, (ii) a first private key provisioned for the first identity of the first user at the key management server 126 associated with the first application 112, and (iii) the first identity of the first user signed into the first application 112. The second set of parameters include (i) a public key of the key management server 136 associated with the second application 114 and (ii) the second identity of the first user signed into the second application 114.

The first application 112 obtains the first identity of the first user signed into the first application 112 from the identity management server 124 when the first user signs into the first application 112. The first application 112 obtains the second identity of the first user signed into the second application 114 in one of different ways. For example, the second identity of the first user signed into the second application 114 is provided to the first application 112 by the first application server 122 or another application server providing a user presence notification service. The second identity of the first user may also be provisioned at the first application 112 by other means, including but not limited to, a preconfigured mapping in the first application 112 of the first identity of the first user to the second identity of the first user.

In one embodiment, a subset of the first set of parameters and a subset of the second set of parameters are locally provisioned (e.g., at static memory 216) into the computing device 110 for access by the first application 112. Additionally, or alternatively, the first application 112 obtains a subset of the first set of parameters and a subset of the second set of parameters from the key management server 126 supporting the first application domain 120 i.e., the application domain which serves the originating application or the application which is intending to invoke an intent. In this embodiment, in response to determining that the first application 112 is intending to invoke an intent with the second application 114 running on the computing device 110 on behalf of the first user, but prior to encrypting or signing the key exchange message containing the intent private key generated at block 430, the first application 112 retrieves a first user token (e.g., stored at the static memory 216) associated with the first identity of the first user. The first user token refers to a digital credential (e.g., JavaScript Object Notation (JSON) token) issued by the identity management server 124 supporting the first application domain 120 after the first user successfully authenticates and authorizes the first application 112 to access specific resources on behalf of the first user. The user token may include user information (e.g., user identifier), expiration time, and signature verifying that the token was issued by a trusted identity management server 124. After retrieving the first user token associated with the first identity of the first user, the first application 112 transmits a request including the first user token associated with the first identity of the first user to the key management server 126 associated with the first application 112. The request may also include information identifying the terminating application or the second application 114 which is intended to accept the requested intent and the security policy which specifies that the first and second applications 112, 114 need to be signed in by the same user when the intent is accepted at the second application 114. In response to receiving the request from the first application 112, the key management server 126 validates the first user token included in the request received from the first application and provides a response to the first application 112 including a subset of the first set of parameters and the second set of parameters. In one embodiment, the key management server 126 validates the user token by communicating with the identity management server 124 supporting the first application domain 120 and further verifying that the first user is currently signed into the first application 112. After validating the first user token, the key management server 126 retrieves a subset of the first set of parameters including (i) a public key of the key management server 126 associated with the first application 112 and (ii) a first private key provisioned for the first identity of the first user at the key management server 126 associated with the first application 112. In addition, the key management server 126 retrieves the second set of parameters including a public key of the key management server 136 associated with the second application 114 as provisioned at the key management server 126. The public key of the key management server 136 associated with the second application 114 may be provisioned, for example, based on an out-of-band communication with key management servers supporting other application domains. Regardless of how the first application 112 obtains a subset of the first set of parameters associated with the first identity of the first user and a subset of the second set of parameters associated with the second identity of the first user, the first application 112 encrypts and signs the key exchange message encapsulating the intent private key using one or more of the first set of parameters and one or more of the second set of parameters.

At block 450, after encrypting and signing the key exchange message encapsulating the intent private key, the first application 112 transmits the key exchange message to the second application 114. The second application 114 receives the key exchange message and retrieves the intent private key encapsulated in the key exchange message. Before the second application 114 can retrieve and use the intent private key, the second application 114 decrypts the key exchange message and further verifies a signature applied to the key exchange message using one or more of a third set of parameters associated with the first identity of the first user and one or more of a fourth set of parameters associated with the second identity of the first user. The second application 114 may use any suitable method known in the art for decrypting and verifying the signature applied to the key exchange message. In one embodiment, the second application 114 is similarly programmed to use an identity based encryption scheme such as the MIKEY-SAKKE scheme. In this embodiment, the third set of parameters include (i) a public key of the key management server 136 associated with the second application 114, (ii) a second private key provisioned for the second identity of the first user at the key management server 136 associated with the second application 114, and (iii) the second identity of the first user signed into the second application 114. The fourth set of parameters include (i) a public key of the key management server 126 associated with the first application 112 and (ii) the first identity of the first user signed into the first application 112.

The second application 114 obtains the second identity of the first user signed into the second application 114 from the identity management server 134 when the first user signs into the second application 114. The second application 112 obtains the first identity of the first user signed into the first application 114 in one of different ways. For example, the first identity of the first user signed into the first application 114 is provided to the second application 114 by the second application server 132 or another application server providing a user presence notification service. The first identity may also be provisioned at the second application 114 by other means, including but not limited to, a preconfigured mapping in the second application 114 of the first identity of the first user to the second identity of the first user.

In one embodiment, the third and fourth set of parameters are locally provisioned (e.g., at static memory 216) into the computing device 110 for access by the second application 114. Additionally or alternatively, the second application 114 obtains a subset of the third and fourth set of parameters from the key management server 136 supporting the second application domain 120 i.e., the application domain which serves the terminating application or the application which is intending to accept an intent. In this embodiment, in response to determining that the second application 114 is intending to accept an intent invoked by the first application 112 running on the computing device 110 on behalf of the first user, but prior to decrypting the key exchange message received from the first application 112, the second application 114 retrieves a second user token (e.g., stored at the static memory 216) associated with the second identity of the first user. The second user token refers to a digital credential (e.g., JSON token) issued by the identity management server 134 supporting the second application domain 130 after the first user successfully authenticates and authorizes the second application 114 to access specific resources on behalf of the first user. The user token may include user information (e.g., user identifier), expiration time, and signature verifying that the token was issued by a trusted identity management server 134. After retrieving the second user token associated with the second identity of the first user, the second application 114 transmits a request including the second user token associated with the second identity of the first user to the key management server 136 associated with the second application 114. The request may also include information identifying the originating application or the first application 112 which is invoking an intent and the security policy which specifies that the first and second applications 112, 114 need to be signed in by the same user when the intent is accepted at the second application 114. In response to receiving the request from the second application 114, the key management server 136 validates the second user token included in the request received from the second application 114 and provides a response to the second application 114 including a subset of the third set of parameters and a subset of the fourth set of parameters. In one embodiment, the key management server 136 validates the user token by communicating with the identity management server 134 supporting the second application domain 130 and further verifying that the first user is currently signed into the second application 114. After validating the second user token, the key management server 136 retrieves a subset of the third set of parameters including (i) a public key of the key management server 136 associated with the second application 114 and (ii) a second private key provisioned for the second identity of the first user at the key management server 136 associated with the second application 114. In addition, the key management server 136 retrieves the fourth set of parameters including a public key of the key management server 126 associated with the first application 112 as provisioned at the key management server 136. The public key of the key management server 126 associated with the first application 112 may be provisioned, for example, based on an out-of-band communication with key management servers supporting other application domains. Regardless of how the second application 114 obtains a subset of the third set of parameters associated with the first identity of the first user and a subset of the fourth set of parameters associated with the second identity of the first user, the second application 114 decrypts the key exchange message, verifies the signature applied to the key exchange message, and retrieves the intent private key using one or more of the third set of parameters and one or more of the fourth set of parameters. The second application 114 can then use the intent private key to decrypt any intent invoked by the first application 112 as long as the first user is signed into the second application 114 using the second identity of the first user.

At block 460, the first application 112 securely communicates the intent to the second application 114 by encrypting the intent using the intent private key generated at block 430. The first application 112 may encrypt any messaging object or message representing the intent invoked by the first application 112. As an example, when the intent invoked by the first application 112 or a messaging application is to request the second application 114 or a navigation application to launch a navigation service corresponding to an address selected by a user who is signed into the first application 112, the first application 112 may encrypt one or more parameters that define an intent action (e.g., generate a route guidance) to be performed by the second application 114 and any additional data (e.g., address to which the route guidance is to be generated) required for the second application 114 to execute the intent action. The second application 114 decrypts the intent (e.g., intent action and any additional data) received from the first application 112 using the intent private key previously received from the first application 112. After decrypting the intent, the second application 114 executes one or more actions defined by the intent received from the first application 112. As an example, the second application 114 or the navigation application may execute an action (e.g., by communicating with the application server 132 supporting the second application 114) defined by the intent in order to provide a service such as by generating a route guidance corresponding to the address information included in the intent received from the first application 112.

In accordance with some embodiments, the second application 114 may similarly use the intent private key to encrypt any intent invoked by the second application 114 with the first application 112. For example, the second application 114 or the navigation application may invoke its own intent to provide route guidance to the first user via the first application 112 or the messaging application while encrypting such information included in the intent communicated to the first application 112 or the messaging application using the intent private key. The first application 112 decrypts any intent received from the second application 114 in a similar manner using the intent private key as described in the process 400.

Figure 5:
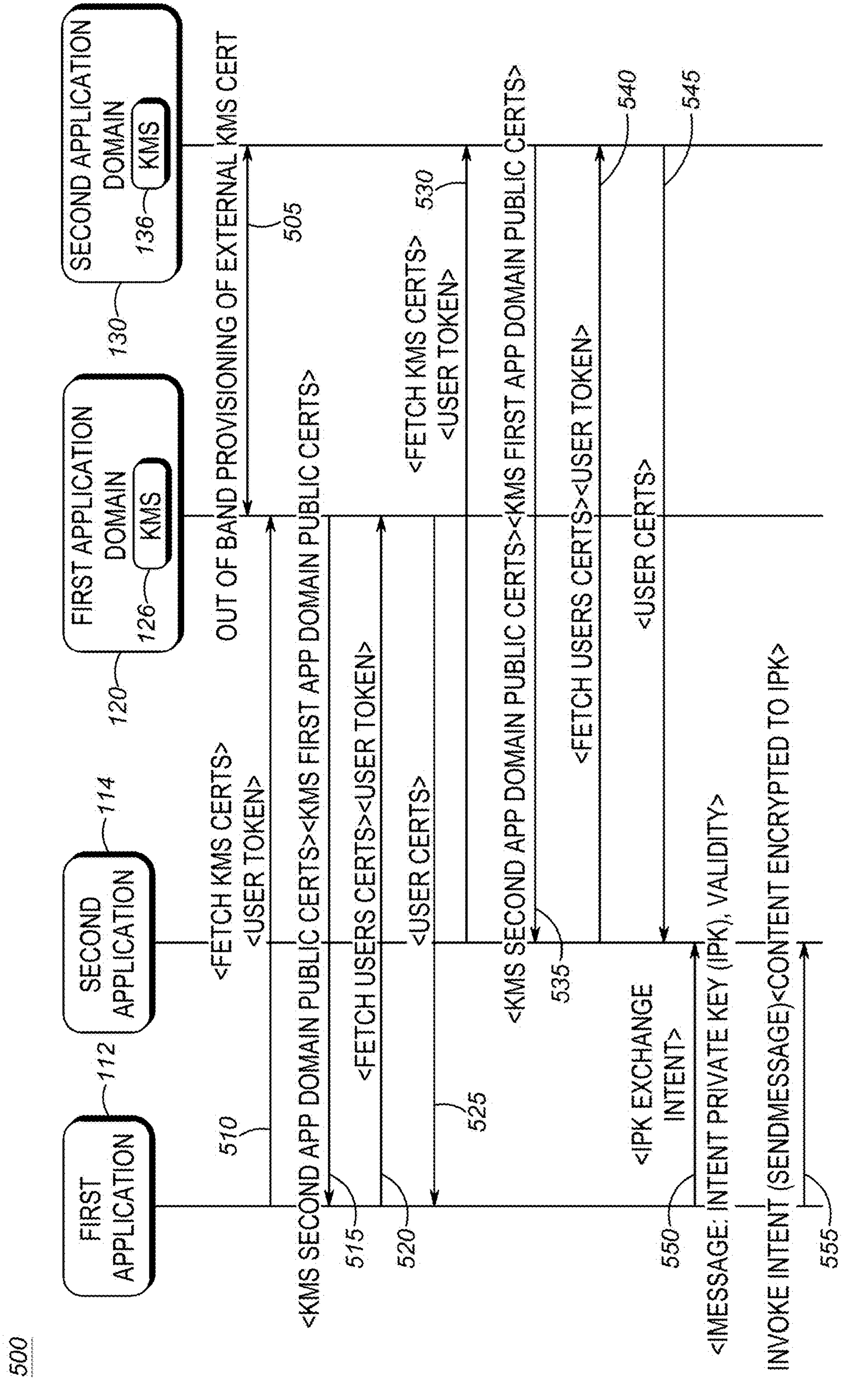
FIG. 5 is a message flow diagram illustrating the process shown in FIG. 4 in accordance with some embodiments.

FIG. 5 is a message flow diagram 500 illustrating the process 400 described above with reference to FIG. 4 in accordance with some embodiments. The message flow diagram 500 illustrates messages exchanged between the first and second applications 112, 114, the first application domain 120 including the key management server 126, and the second application domain 130 including the key management server 136 in facilitating the secure communication of intents between the first and the second applications 112, 114 running on the computing device 110.

The key management servers 126, 136 may exchange messages 505 to provision KMS certificates of the key management server in another application domain. Before the first application 112 can communicate an intent with another application, a user (e.g., the "first user" described in the process 400 illustrated in FIG. 4) needs to successfully sign into the first application 112, for example, by authenticating with the identity management server 124 associated with the first application domain 120. As a result of the authentication, the first application 112 receives a first user token associated with a first identity of the first user signed into the first application 112. The first application 112 then sends a message 510 to the key management server 126 serving the first application domain 120 requesting the key management server 126 to provide a KMS certificate of the key management server 126 associated with the first application 112 and a KMS certificate of the key management server 136 associated with the second application 114. The request message 510 includes the first user token associated with the first identity of the first user to enable the key management server 126 to validate the first user token (e.g., with the identity management server 124 serving the first application domain 120). The key management server 126 validates the first user token and sends a response message 515 including the KMS certificate of the key management server 126 associated with the first application 112 and the KMS certificate of the key management server 136 associated with the second application 114. The first application 112 then sends a request message 520 to the key management server 126 serving the first application domain 120 requesting the key management server 126 to provide a user certificate associated with a user signed into the first application. The request message 520 includes the first user token associated with the first user to enable the key management server 126 to validate the first user token (e.g., with the identity management server 124 serving the first application domain). The key management server 126 validates the first user token and sends a response message 525 including the user certificate (e.g., private key) associated with the first identity of the first user signed into the first application 112. The key management server 126 may also additionally send information to the first application 112 identifying the second identity of the first user signed into the second application 114.

The second application 114 similarly exchanges messages with the key management server 136 serving the second application domain 130 before the second application 114 can invoke with or accept an intent from the first application 112. The second application 114 sends a message 530 to the key management server 136 serving the second application domain 120 requesting the key management server 136 to provide a KMS certificate of the key management server 126 associated with the first application 112 and a KMS certificate of the key management server 136 associated with the second application 114. The request message 530 includes a second user token which is obtained, for example, from the identity management server 134 serving the second application domain 130, as a result of the first user signing into the second application 114 using a second identity of the first user. The key management server 136 validates the first user token, for example, by communicating with the identity management server 134 serving the second application domain 130 and sends a response message 535 including the KMS certificate of the key management server 126 associated with the first application 112 and the KMS certificate of the key management server 136 associated with the second application 114. The second application 114 then sends a request message 540 to the key management server 136 serving the second application domain 120 to request the key management server 136 to provide a user certificate associated with a user signed into the second application 114. The request message 540 includes the second user token associated with the second identity of the first user to enable the key management server 136 to validate the second user token (e.g., with the identity management server 134 serving the second application domain 130). The key management server 136 validates the second user token and sends a response message 545 including the user certificate (e.g., private key) associated with the second identity of the first user signed into the second application 114.

The first application 112 sends a key exchange message 550 encapsulating the intent private key (IPK) along with a validity period for the key. The first application 112 uses one or more of the parameters (e.g., KMS certificates and user certificates) included in the messages 515, 525 received from the key management server 126, the first identity of the first user signed into the first application 112, and the second identity of the first user signed into the second application 114 to encrypt and sign the key encryption message. The second application 114 decrypts the key exchange message, verifies a signatures applied to the key exchange message, and retrieves the intent private key using one or more of the parameters (e.g., KMS certificates and user certificates) included in the messages 535, 545 received from the key management server 136, the first identity of the first signed into the first application 112, and the second identity of the first user signed into the second application 114.

The first application 112 invokes an intent with the second application 114 by communicating an intent message 555 containing the intent. The first application 112 encrypts the intent message or any messaging object representing the intent using the intent private key. The second application 114 retrieves the intent by decrypting the intent message or any messaging object representing the intent using the intent private key previously received from the first application 112. After decrypting the intent message, the second application 114 executes one or more actions or services requested in the intent received from the first application 112.

Figure 6:
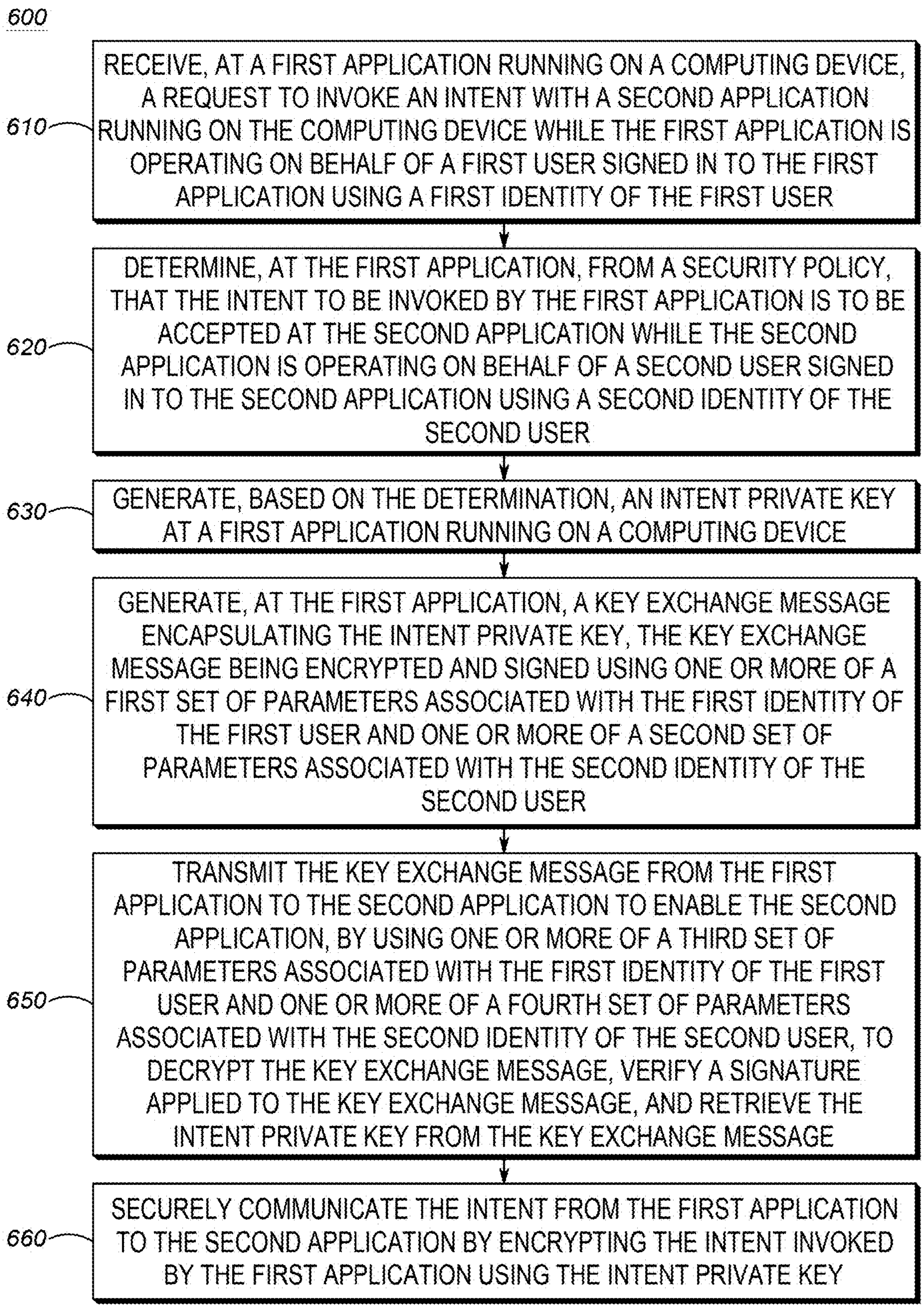
FIG. 6 illustrates a flowchart of another process for securely communicating intents between applications running on a same computing device in accordance with some embodiments.

Turning now to FIG. 6, a flowchart diagram illustrates another process 600 for authorizing an interaction between applications (e.g., first and second applications 112, 114) running on a computing device 110. While a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure. A first application 112 running on the computing device shown in FIG. 1 and/or FIG. 2, may execute process 600 via an electronic processor 213.

The first application 112 may execute the process 600 at power-on, at some predetermined periodic time period thereafter, in response to a trigger raised locally at the computing device 110 via an internal process or via an input interface or in response to a trigger from an external device to which the first application 112 running on the computing device 110 is communicably coupled, among other possibilities.

The process 600 of FIG. 6 need not be performed in the exact sequence as shown and likewise various blocks may be performed in different order or alternatively in parallel rather than in sequence. The process 600 may be implemented on variations of the system 100 of FIG. 1 as well. The process 600 may also involve message exchanges similar to the one shown and described with reference to FIG. 5.

While the process 400 shown in FIG. 4 is described in relation to a security policy that requires a same user to sign into both the first and second applications 112, 114 in order for the first application 112 to share an intent private key with the second application 114 to enable the second application 114 to retrieve and use the intent private key for decrypting intents received from the first application 112, the process 600 relates to a security policy that allows a first application 112 to share an intent private key with a second application 114 where the second application 114 is signed in by a second user (e.g., a user particularly authorized by the security policy) different from a first user signed into the first application 112. The "second user" described herein may refer to a business, organization, agency, or another individual user different from the "first user."

An example of a scenario in which the process 600 can be implemented for securely communicating intents between applications running on a same computing device is described below. Assume a scenario where a company (or a second user) issues its employees with computing devices running one or more pre-installed applications including a first application 112, for example, a messaging application and a second application 114 for example, a calendar event application. The company may pre-sign into the second application 114 or the calendar event application on all the computing devices issued to the employees to schedule company-initiated events. The "first user" may be issued a computing device 110 by the company with the calendar event application pre-installed and running on the computing device 110. Further, assume the calendar event application running on the computing device 110 is pre-signed in using an identity of the company before the computing device 110 is physically issued to the first user. The first user may use the first application 112 or the messaging application to interact with the second application 114 or the calendar event application to check whether there is a company-initiated event scheduled at a given time. The interaction between the first application 112 and the second application 114 involves: (i) the first application invoking/communicating an intent to the second application 114 to request for a specific information i.e., to check for a company-initiated event at a given time specified by the first user and (ii) the second application 114 executing the requested intent and in response invoking/communicating its own intent to provide the specific information requested by the first user via the first application 112. In this scenario, a security policy (e.g., security policy 230) provisioned by the company at the computing device 110 may require such communications of intents between the first application 112 signed in by the first user and the second application 114 pre-signed in by the second user or the company to be secured and encrypted in accordance with the process 600 described herein.

At block 610, the first application 112 receives a request to invoke an intent with a second application 114 (e.g., the calendar event application installed by the second user or the company) running on the same computing device 110 while the first application 112 is operating on behalf of the first user signed into the first application 112 using a first identity of the first user. The term "first identity" refers to one or more identities used by the first user to sign into the first application 112 after successfully authenticating, for example, with the identity management server 124 supporting the first application domain 120. The first identity includes, but is not limited to, username, user identifier, email address, mobile number, tokens, or other unique identifiers recognized by the identity management server 124 supporting the first application domain 120. In one embodiment, the request to invoke an intent with the second application 114 may be received at the first application 112 (e.g., the messaging application) based on an input received (e.g., via an input interface 309 of the computing device 110) from the first user signed into the first application 112.

At block 620, the first application 112 determines, from a security policy (e.g., security policy 230 provisioned at the computing device 110), that the intent requested to be invoked by the first application 112 is to be accepted at the second application 114 while the second application 114 is operating on behalf of a second user signed into the second application 114 using a second identity of the second user. The second user is a user different from the first user who is signed into the first application 112. In the example scenario described above, the second user is a company which issued the computing device 110 to the first user with a pre-installed and pre-signed in calendar event application running on the computing device 110. The security policy may identify a particular user as the second user and may further indicate that the second user is authorized to access information included in intents invoked by the first application 112 and accepted at the second application 114 as long as the second application 114 is signed in by the second user. In this case, since the security policy requires a particular user (i.e., the second user) to be operating or controlling the second application 114 while accepting (i.e., executing the requested intent) the intent, the first application 112 determines that the first application 112 is required by the security policy to securely communicate the intent to the second application 114 by encrypting the intent prior to invoking the intent with the second application 114. The term "second identity" refers to one or more identities used by the second user to sign into the second application 114 after successfully authenticating with the identity management server 134 supporting the second application domain 130. The second identity includes, but is not limited to, username or company name, user identifier or company identifier, email address, mobile number, tokens, or other unique identifiers recognized by the identity management server 134 supporting the second application domain 120.

When the first application 112 determines that the security policy requires encryption of the requested intent before invoking the intent with the second application 114, the first application 112 proceeds to block 630 to generate an intent private key (e.g., a symmetric key) using any suitable key generation algorithms known in the art.

At block 640, the first application 112 generates a key exchange message encapsulating the intent private key generated at block 630. In accordance with embodiments, the first application 112 encrypts and signs the key exchange message using one or more of a first set of parameters associated with the first identity of the first user signed into the first application 112 and one or more of a second set of parameters associated with the second identity of the second user signed into the second application 114. The first application 112 may use any suitable method known in the art for encrypting and signing the key exchange message. In one embodiment, the first application 112 is programmed to use an identity based encryption scheme such as the MIKEY-SAKKE scheme. In this embodiment, the first set of parameters include (i) a public key of the key management server 126 associated with the first application 112, (ii) a first private key provisioned for the first identity of the first user at the key management server 126 associated with the first application 112, and (iii) the first identity of the first user signed into the first application 112. The second set of parameters include (i) a public key of the key management server 136 associated with the second application 114 and (ii) the second identity of the second user signed into the second application 114.

The first application 112 obtains the first identity of the first user signed into the first application 112 from the identity management server 124 when the first user signs into the first application 112. The first application 112 obtains the second identity of the second user signed into the second application 114 in one of different ways. For example, the second identity of the second user signed into the second application 114 is provided to the first application 112 by the first application server 122 or another application server providing a user presence notification service.

In one embodiment, a subset of the first and second set of parameters are locally provisioned (e.g., at static memory 216) into the computing device 110 for access by the first application 112. Additionally or alternatively, the first application 112 obtains a subset of the first set of parameters and a subset of the second set of parameters from the key management server 126 supporting the first application domain 120 i.e., the application domain which serves the originating application or the application which is intending to invoke an intent. In this embodiment, in response to determining that the first application 112 is intending to invoke an intent with the second application 114 running on the computing device 110 on behalf of the first user, but prior to encrypting or signing the key exchange message containing the intent private key generated at block 630, the first application 112 retrieves a first user token (e.g., stored at the static memory 216) associated with the first identity of the first user. The first user token refers to a digital credential (e.g., JSON token) issued by the identity management server 124 supporting the first application domain 120 after the first user successfully authenticates and authorizes the first application 112 to access specific resources on behalf of the first user. The user token may include user information (e.g., first user identity), expiration time, and signature verifying that the token was issued by a trusted identity management server 124. After retrieving the first user token associated with the first identity of the first user, the first application 112 transmits a request including the first user token associated with the first identity of the first user to the key management server 126 associated with the first application 112. The request may also include information identifying the terminating application or the second application 114 which is intended to accept the requested intent and the security policy which specifies that the second application 114 is to be signed in by a particular second user when the intent is accepted at the second application 114. In response to receiving the request from the first application 112, the key management server 126 validates the first user token included in the request received from the first application 112 and provides a response to the first application 112 including a subset of the first set of parameters and a subset of the second set of parameters. In one embodiment, the key management server 126 validates the user token by communicating with the identity management server 124 supporting the first application domain 120 and further verifying that the first user is currently signed into the first application 112. After validating the first user token, the key management server 126 retrieves a subset of the first set of parameters including (i) a public key of the key management server 126 associated with the first application 112 and (ii) a first private key provisioned for the first identity of the first user at the key management server 126 associated with the first application 112. In addition, the key management server 126 retrieves a subset of the second set of parameters including a public key of the key management server 136 associated with the second application 114 as provisioned at the key management server 126. The public key of the key management server 136 associated with the second application 114 may be provisioned, for example, based on an out-of-band communication with key management servers supporting other application domains. Regardless of how the first application 112 obtains a subset of the first set of parameters associated with the first identity of the first user and a subset of the second set of parameters associated with the second identity of the second user, the first application 112 encrypts and signs the key exchange message encapsulating the intent private key using one or more of the first set of parameters and one or more of the second set of parameters.

At block 650, after encrypting and signing the key exchange message encapsulating the intent private key, the first application 112 transmits the key exchange message to the second application 114. The second application 114 receives the key exchange message and retrieves the intent private key encapsulated in the key exchange message. Before the second application 114 can retrieve and use the intent private key, the second application 114 decrypts the key exchange message and further verifies a signature applied to the key exchange message using one or more of a third set of parameters associated with the first identity of the first user and one or more of a fourth set of parameters associated with the second identity of the second user. The second application 114 may use any suitable method known in the art for decrypting and verifying the signature applied to the key exchange message. In one embodiment, the second application 114 is similarly programmed to use an identity based encryption scheme such as the MIKEY-SAKKE scheme. In this embodiment, the third set of parameters include (i) a public key of the key management server 136 associated with the second application 114, (ii) a second private key provisioned for the second identity of the second user at the key management server 136 associated with the second application 114, and (iii) the second identity of the second user signed into the second application 114. The fourth set of parameters include (i) a public key of the key management server 126 associated with the first application 112 and (ii) the first identity of the first user signed into the first application 112.

The second application 114 obtains the second identity of the second user signed into the second application 114 from the identity management server 134 when the second user signs into the second application 114. The second application 112 obtains the first identity of the first user signed into the first application 114 in one of different ways. For example, the first identity of the first user signed into the first application 114 is provided to the second application 114 by the second application server 132 or another application server providing a user presence notification service.

In one embodiment, a subset of the third and fourth set of parameters are locally provisioned (e.g., at static memory 216) into the computing device 110 for access by the second application 114. In another embodiment, the second application 114 obtains a subset of the third and fourth set of parameters from the key management server 136 supporting the second application domain 120 i.e., the application domain which serves the terminating application or the application which is intending to accept an intent. In this embodiment, in response to determining that the second application 114 is intending to accept an intent invoked by the first application 112 running on the computing device 110 on behalf of the first user, but prior to decrypting the key exchange message received from the first application 112, the second application 114 retrieves a second user token (e.g., stored at the static memory 216) associated with the second identity of the second user. The second user token refers to a digital credential (e.g., JSON token) issued by the identity management server 134 supporting the second application domain 130 after the second user successfully authenticates and authorizes the second application 114 to access specific resources on behalf of the second user. The user token may include user information (e.g., user identifier), expiration time, and signature verifying that the token was issued by a trusted identity management server 134. After retrieving the second user token associated with the second identity of the second user, the second application 114 transmits a request including the second user token associated with the second identity of the second user to the key management server 136 associated with the second application 114. The request may also include information identifying the originating application or the first application 112 which is invoking an intent and the security policy which specifies that the second application 114 is to be signed in by a particular second user when the intent is accepted at the second application 114. In response to receiving the request from the second application 114, the key management server 136 validates the second user token included in the request received from the second application 114 and provides a response to the second application 114 including a subset of the third set of parameters and a subset of the fourth set of parameters. In one embodiment, the key management server 136 validates the user token by communicating with the identity management server 134 supporting the second application domain 130 and further verifying that the second user is currently signed into the second application 114. After validating the second user token, the key management server 136 retrieves a subset of the third set of parameters including (i) a public key of the key management server 136 associated with the second application 114 and (ii) a second private key provisioned for the second identity of the first user at the key management server 136 associated with the second application 114. In addition, the key management server 136 retrieves a subset of the fourth set of parameters including a public key of the key management server 126 associated with the first application 112 as provisioned at the key management server 136. The public key of the key management server 126 associated with the first application 112 may be provisioned, for example, based on an out-of-band communication with key management servers supporting other application domains. Regardless of how the second application 114 obtains a subset of the third set of parameters associated with the first identity of the first user and a subset of the fourth set of parameters associated with the second identity of the second user, the second application 114 decrypts the key exchange message, verifies the signature applied to the key exchange message, and retrieves the intent private key using one or more of the third set of parameters and one or more of the fourth set of parameters. The second application 114 can then use the intent private key to decrypt any intent invoked by the first application 112 as long as the second user is signed into the second application 114 using the second identity of the second user.

At block 660, the first application 112 securely communicates the intent to the second application 114 by encrypting the intent using the intent private key generated at block 430. The first application 112 may encrypt any messaging object or message representing the intent invoked by the first application 112. As an example, when the intent invoked by the first application 112 or the messaging application is to request the second application 114 or the calendar event application pre-installed by the second user or the company to check for a company-initiated event scheduled at a given time, the first application 112 may encrypt one or more parameters that define an intent action (e.g., check for a company-initiated event scheduled at a given time) to be performed by the second application 114 and any additional data (e.g., given time) required for the second application 114 to execute the intent action. The second application 114 decrypts the intent (e.g., intent action and any additional data) received from the first application 112 using the intent private key previously received from the first application 112. After decrypting the intent, the second application 114 executes one or more actions defined by the intent received from the first application 112. As an example, the second application 114 or the calendar event application may execute an action (e.g., by communicating with the application server 132 supporting the second application 114) defined by the intent in order to provide a service such as to identify a company-initiated event scheduled at a given time specified in the request received from the first application 112.

In accordance with some embodiments, the second application 114 may similarly use the intent private key to encrypt any intent invoked by the second application 114 with the first application 112. For example, the second application 114 or the calendar event application may invoke its own intent to provide information identifying the company-initiated event scheduled at a given time while encrypting such information included in the intent communicated to the first application 112 or the messaging application. The first application 112 decrypts any intent received from the second application 114 in a similar manner as described in the process 400 using the intent private key.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for securely communicating intents between applications running on a same computing device, the method comprising:

receiving, at a first application running on a computing device, a request to invoke an intent with a second application running on the computing device while the first application is operating on behalf of a first user signed in to the first application using a first identity of the first user;

determining, at the first application, from a security policy, that the intent to be invoked by the first application is to be accepted at the second application while the second application is operating on behalf of the first user signed in to the second application using a second identity of the first user;

generating, based on the determination, an intent private key at a first application running on a computing device;

generating, at the first application, a key exchange message encapsulating the intent private key, the key exchange message being encrypted and signed using one or more of a first set of parameters associated with the first identity of the first user and one or more of a second set of parameters associated with the second identity of the first user;

transmitting the key exchange message from the first application to the second application to enable the second application, by using one or more of a third set of parameters associated with the first identity of the first user and one or more of a fourth set of parameters associated with the second identity of the first user, to decrypt the key exchange message, verify a signature applied to the key exchange message, and retrieve the intent private key from the key exchange message; and securely communicating the intent from the first application to the second application by encrypting the intent invoked by the first application using the intent private key.

2. The method of claim 1, wherein the computing device is a mobile computing device.

3. The method of claim 1, wherein the first identity of the first user and the second identity of the first user are the same.

4. The method of claim 1, wherein the first application uses an identity-based encryption scheme for encrypting and signing the key encryption message.

5. The method of claim 1, wherein:

the first set of parameters include (i) a public key of a key management server associated with the first application; (ii) a first private key provisioned for the first identity of the first user at the key management server associated with the first application; and (iii) the first identity of the first user;

the second set of parameters include (i) a public key of a key management server associated with the second application; and (ii) the second identity of the first user;

the third set of parameters include (i) a public key of a key management server associated with the second application; (ii) a second private key provisioned for the second identity of the first user at the key management server associated with the second application; and (iii) the second identity of the first user; and the fourth set of parameters include (i) a public key of a key management server associated with the first application; and (ii) the first identity of the first user.

6. The method of claim 1, further comprising:

retrieving, at the first application, a first user token associated with the first identity of the first user, in response to determining that the first application is intending to invoke an intent with the second application running on the computing device on behalf of the first user;

transmitting, from the first application to a key management server associated with the first application, a request including the first user token associated with the first identity of the first user; and receiving, at the first application, from the key management server associated with the first application, a response including a subset of the first set of parameters and a subset of the second set of parameters.

7. The method of claim 1, further comprising:

provisioning the first application with information containing the first set of parameters and the second set of parameters.

8. The method of claim 1, wherein the second application uses an identity based encryption scheme to decrypt the key exchange message, verify the signature applied to the key exchange message, and retrieve the intent private key from the key exchange message.

9. The method of claim 1, further comprising:

decrypting, at the second application, the key exchange message to retrieve the intent private key; and verifying, at the second application, that the signature applied to the key exchange message by the first application corresponds to the first identity of the first user, wherein the decrypting and the verifying are performed at the second application using one or more of the third set of parameters and one or more of the fourth set of parameters.

10. The method of claim 1, further comprising:

retrieving, at the second application, a second user token associated with the second identity of the first user signed in to the second application at the computing device in response to determining that the second application is intending to accept an intent from the first application running on the computing device on behalf of the first user;

transmitting, from the second application to a key management server associated with the second application, a request including the user token associated with the second identity of the first user; and receiving, at the second application, from the key management server associated with the second application, a response including the third set of parameters and the fourth set of parameters.

11. The method of claim 1, further comprising:

provisioning the second application with information containing the third set of parameters and the fourth set of parameters.

12. A method for securely communicating intents between applications running on a same computing device, the method comprising:

receiving, at a first application running on a computing device, a request to invoke an intent with a second application running on the computing device while the first application is operating on behalf of a first user signed in to the first application using a first identity of the first user;

determining, at the first application, from a security policy, that the intent to be invoked by the first application is to be accepted at the second application while the second application is operating on behalf of a second user signed in to the second application using a second identity of the second user;

generating, based on the determination, an intent private key at a first application running on a computing device;

generating, at the first application, a key exchange message encapsulating the intent private key, the key exchange message being encrypted and signed using one or more of a first set of parameters associated with the first identity of the first user and one or more of a second set of parameters associated with the second identity of the second user;

transmitting the key exchange message from the first application to the second application to enable the second application, by using one or more of a third set of parameters associated with the first identity of the first user and one or more of a fourth set of parameters associated with the second identity of the second user, to decrypt the key exchange message, verify a signature applied to the key exchange message, and retrieve the intent private key from the key exchange message; and securely communicating the intent from the first application to the second application by encrypting the intent invoked by the first application using the intent private key.

13. The method of claim 12, wherein the computing device is a mobile computing device.

14. The method of claim 12, wherein the first application uses an identity based encryption scheme for encrypting and signing the key encryption message.

15. The method of claim 12, wherein:

the first set of parameters include (i) a public key of a key management server associated with the first application; (ii) a first private key provisioned for the first identity of the first user at the key management server associated with the first application; and (iii) the first identity of the first user;

the second set of parameters include (i) a public key of a key management server associated with the second application; and (ii) the second identity of the second user;

the third set of parameters include (i) a public key of a key management server associated with the second application; (ii) a second private key provisioned for the second identity of the second user at the key management server associated with the second application; and (iii) the second identity of the second user; and the fourth set of parameters include (i) a public key of a key management server associated with the first application; and (ii) the first identity of the first user.

16. The method of claim 12, further comprising:

retrieving, at the first application, a first user token associated with the first identity of the first user, in response to determining that the first application is intending to invoke an intent with the second application running on the computing device on behalf of the first user;

transmitting, from the first application to a key management server associated with the first application, a request including the first user token associated with the first identity of the first user; and receiving, at the first application, from the key management server associated with the first application, a response including a subset of the first set of parameters and a subset of the second set of parameters.

17. The method of claim 12, further comprising:

provisioning the first application with information containing the first set of parameters and the second set of parameters.

18. The method of claim 12, wherein the second application uses an identity based encryption scheme to decrypt the key exchange message, verify the signature applied to the key exchange message, and retrieve the intent private key from the key exchange message.

19. A computing device, comprising:

an electronic processor; and a memory communicatively coupled to the electronic processor, the memory storing program instructions that, when executed by the electronic processor, cause a first application running on the computing device to:

receive a request to invoke an intent with a second application running on the computing device while the first application is operating on behalf of a first user signed in to the first application using a first identity of the first user;

determine, from a security policy, that the intent to be invoked by the first application is to be accepted at the second application while the second application is operating on behalf of the first user signed in to the second application using a second identity of the first user;

generate, based on the determination, an intent private key;

generate, at the first application, a key exchange message encapsulating the intent private key, the key exchange message being encrypted and signed using one or more of a first set of parameters associated with the first identity of the first user and one or more of a second set of parameters associated with the second identity of the first user;

transmit the key exchange message to the second application to enable the second application, by using one or more of a third set of parameters associated with the first identity of the first user and one or more of a fourth set of parameters associated with the second identity of the first user, to decrypt the key exchange message, verify a signature applied to the key exchange message, and retrieve the intent private key from the key exchange message; and securely communicate the intent to the second application by encrypting the intent invoked by the first application using the intent private key.

20. The computing device of claim 19, wherein:

the first set of parameters include (i) a public key of a key management server associated with the first application; (ii) a first private key provisioned for the first identity of the first user at the key management server associated with the first application; and (iii) the first identity of the first user;

the second set of parameters include (i) a public key of a key management server associated with the second application; and (ii) the second identity of the first user;

the third set of parameters include (i) a public key of a key management server associated with the second application; (ii) a second private key provisioned for the second identity of the first user at the key management server associated with the second application; and (iii) the second identity of the first user; and the fourth set of parameters include (i) a public key of a key management server associated with the first application; and (ii) the first identity of the first user.

* * * * *